United States Patent
Madhavarao et al.

(10) Patent No.: US 8,373,078 B2
(45) Date of Patent: Feb. 12, 2013

(54) SYSTEM AND METHOD FOR LOAD MEASURING BY MOTOR TORQUE

(75) Inventors: Gopal Madhavarao, Alpharetta, GA (US); Ken Furem, Cumming, GA (US); Daniel W. Robertson, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 1280 days.

(21) Appl. No.: 10/882,854

(22) Filed: Jul. 1, 2004

(65) Prior Publication Data

US 2005/0034902 A1 Feb. 17, 2005

Related U.S. Application Data

(60) Provisional application No. 60/495,467, filed on Aug. 15, 2003.

(51) Int. Cl.
*G01G 19/08* (2006.01)

(52) U.S. Cl. .......................................... 177/136; 177/1

(58) Field of Classification Search ................ 177/136; 702/173–174

See application file for complete search history.

(56) References Cited

U.S. PATENT DOCUMENTS

| | | | |
|---|---|---|---|
| 4,677,579 A | 6/1987 | Radomilovich | |
| 5,321,637 A | 6/1994 | Anderson | |
| 5,822,224 A * | 10/1998 | Nakanishi et al. | 702/174 |
| 5,850,341 A * | 12/1998 | Fournier et al. | 701/50 |
| 5,970,712 A * | 10/1999 | Stein | 60/639 |
| 5,990,652 A | 11/1999 | Meisner | |
| 6,072,127 A * | 6/2000 | Oslakovic | 177/136 |
| 6,225,574 B1 | 5/2001 | Chang | |
| 6,527,130 B2 * | 3/2003 | Ruddy | 212/278 |

\* cited by examiner

*Primary Examiner* — Sean Kayes (57) ABSTRACT

Certain exemplary embodiments comprise a method for determining a weight of a load associated with an excavating machine, the method comprising: determining a load torque of an excavating machine, the excavating machine comprising a bucket and a hoist motor adapted to vertically move the bucket; and calculating a load weight from the load torque.

20 Claims, 4 Drawing Sheets

SYSTEM AND METHOD FOR LOAD MEASURING BY MOTOR TORQUE

CROSS-REFERENCES TO RELATED APPLICATIONS

This application claims priority to, and incorporates by reference herein in its entirety, pending U.S. Provisional Patent Application Ser. No. 60/495,467, filed 15 Aug. 2003.

BACKGROUND

U.S. Pat. No. 4,677,579 (Radomilovich), which is incorporated by reference herein in its entirety, allegedly cites a "power shovel for surface mining operations is equipped with a Suspended Load Measuring (SLM) system. The SLM system determines the net weight of the material in the shovel bucket by sensing the electrical parameters of the drive motors. A microprocessor inputs the drive motor electrical parameters and processes them according to the known geometry of the power shovel. To meet the requisite accuracy of .+–0.2% for a load measuring system to be effective, the SLM system utilizes a dynamic model which accounts for both conservative and nonconservative dynamic effects prevalent in power shovel operation. Correction are included for the conservative effects of the rotational inertia of the drive motors and reduction gear train, the stretch of the cables, and the inertia of the bucket. Non-conservative losses due to friction, gear loss and motor inefficiency are also compensated for. During truck loading operations, the SLM system maintains a cumulative total of the net weight of material in the truck based on the individual weights of each shovel bucket load. The total weight in the truck is then displayed to the power shovel operator so that the truck can be accurately loaded to full capacity." See Abstract.

U.S. Pat. No. 6,072,127 (Oslakovic), which is incorporated by reference herein in its entirety, allegedly cites an "indirect suspended load weight measuring system that is suitable for use with an excavator that has a moving load bucket rotating about a swing axis. The load bucket has a load therein, and the excavator has a swing drive motor for rotating the bucket, and a hoist rope for supporting the load bucket. The system comprises a torque determination circuit for determining a torque of the swing drive motor and for outputting a motor torque signal having a parameter representative of an instantaneous motor torque. A radius sensing circuit senses a radius of the load bucket with respect to the swing axis and provides a radius signal. A speed sensing circuit determines an angular speed of the load bucket with respect to the swing axis and provides an angular speed signal. A computation circuit responsive to the instantaneous torque signal, the radius signal and the angular speed signal, computes a weight of the moving load." See Abstract.

SUMMARY

Certain exemplary embodiments comprise a method for determining a weight of a load associated with an excavating machine, the method comprising: determining a load torque of an excavating machine, the excavating machine comprising a bucket and a hoist motor adapted to vertically move the bucket; and calculating a load weight from the load torque.

BRIEF DESCRIPTION OF THE DRAWINGS

A wide variety of potential embodiments will be more readily understood through the following detailed description, with reference to the accompanying drawings in which.

DEFINITIONS

When the following terms are used herein, the accompanying definitions apply:

- accumulator—a register or electric circuit in a calculator or computer, in which the results of arithmetical and/or logical operations are formed.
- alternating current (AC)—an electric current that reverses direction in a circuit at regular intervals.
- bucket—a receptacle on an excavating machine adapted to dig, hold, and/or move material such as excavated earth.
- bucket geometric position processor—a processor adapted to provide information related to a physical position of a bucket relative to a reference location.
- cable—a rope comprising metallic fibers.
- communicate—to exchange information.
- comparator—a device adapted to compare a measured property of an object with a standard and/or another measured property of the object.
- correct—to adjust in value.
- data—numbers, characters, symbols etc., that have no "knowledge level" meaning.
- determine—ascertain.
- dynamic friction factor—a dimensionless value indicative of a resistance to motion of one body in motion with respect to another. A dynamic friction factor can be a quotient of frictional force and normal force for a first body in contact with, and in motion with respect to, a second body.
- dynamic torque—a torque associated with moving a bucket and overcoming resistances, losses, and/or friction associated that movement.
- dynamic torque processor—a processor adapted to determine a dynamic torque.
- electric mining shovel—an electrically-powered device adapted to dig, hold, and/or move material such as excavated material.
- electric motor—a motor powered by electricity. An electric motor can comprise two wound members, one stationary, called the stator, and the other rotating, called the rotor.
- empty—holding or containing a negligibly small amount of material.
- excavate—to move material, including any subterranean, submarine, and/or surface material.
- hoist—a system adapted to at least vertically move a bucket of an excavating machine. A hoist can comprise a motor, a gearbox, a clutch, a hydraulic system, one or more pulleys, one or more cables, and/or one or more sensors.
- hoist motor—a motion producing device adapted to provide motive force to at least vertically move a bucket of an excavating machine.
- hoist speed—a velocity related to the motion of a bucket of an excavating machine in a direction having a vertical component.
- hoist torque—the moment of a force related to moving a bucket of an excavating machine, the movement having a vertical component.

hoist torque processor—a processor adapted to ascertain the moment of a force related to moving a bucket of an excavating machine, the movement having a vertical component.

incremental allowable weight—an amount of additional material that can be added to a vehicle without overloading the vehicle beyond a predetermined carrying capacity.

information—data that has been organized to express concepts. Rules for composing information are "semantic" rules. It is generally possible to automate certain tasks involving the management, organization, transformation, and/or presentation of information.

information device—any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, etc.

limit processor—a processor adapted to determine whether the material weight held in an excavating machine bucket is less than an incremental allowable weight for a machine adapted to haul the material.

load cycle—a time interval beginning when an excavating machine digs material such as earth and ending when a bucket of the excavating machine is emptied into a haulage machine.

load torque—a torque required to hold a bucket of an excavating machine in a substantially stationary position.

load torque processor—a processor adapted to determine a load torque and/or a material weight held in a bucket coupled to a hoist.

load weight—a weight associated with a bucket and any excavated material contained therein.

material—any substance that can be excavated.

measurement—a value of a variable, the value determined by manual and/or automatic observation.

metric—a deviation related to at least two values.

mine—an excavation in the earth from which ore, minerals, and/or earth can be extracted.

mine haul truck—a vehicle adapted to haul material extracted from the earth.

motor—an electric, hydraulic, and/or pneumatic device that produces or imparts motion.

part—component.

processor—a hardware, firmware, and/or software machine and/or virtual machine comprising a set of machine-readable instructions adaptable to perform a specific task. A processor acts upon information by manipulating, analyzing, modifying, converting, transmitting the information to another processor or an information device, and/or routing the information to an output device.

relative position—a location with reference to a definable object.

remote—in a distinctly different location.

speedometer—a device adapted to measure a velocity.

static friction factor—a dimensionless value indicative of a resistance to motion of one stationary body with respect to another with which the stationary body is in contact.

substantially stationary—relatively motionless with respect to a particular frame of reference.

sum—add.

truck weight processor—a processor adapted to determine a weight of material held in a mine haul truck based on data provided from a bucket weight processor.

velocity—speed.

vertically move—to lift and/or lower.

weight—the force with which a body is attracted toward Earth, equal to the product of the object's mass and the acceleration of gravity.

wireless transmitter—a device adapted to transfer a signal from a source to a destination without the use of wires.

DETAILED DESCRIPTION

Figure 1:
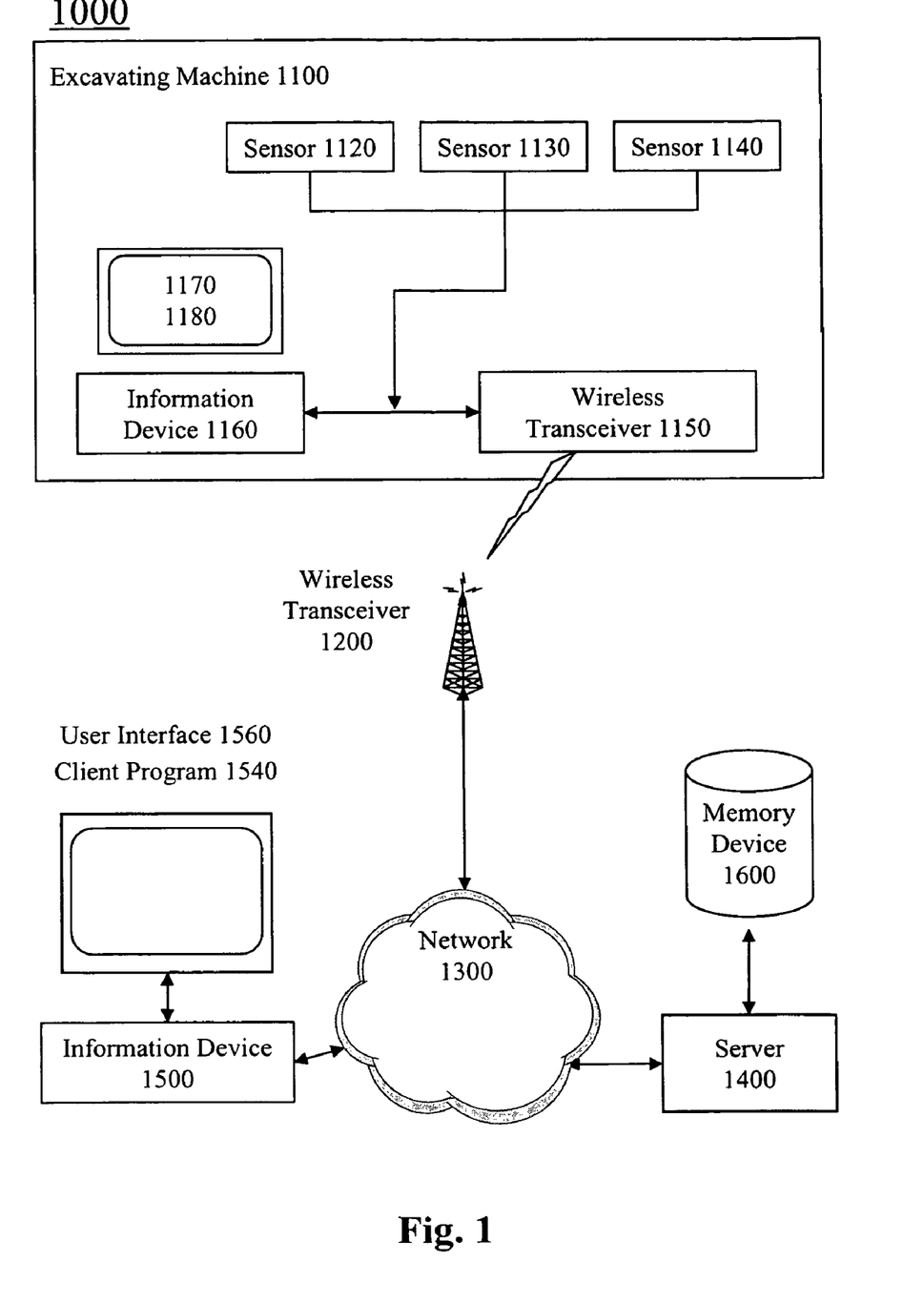
FIG. 1 is a block diagram of an exemplary embodiment of a load measuring data management system 1000.

FIG. 1 is a block diagram of an exemplary embodiment of a load measuring data management system 1000. Load measuring data management system 1000 can comprise an excavating machine 1100. In certain exemplary embodiments, excavating machine 1100 can be a mining shovel such as an electric mining shovel. In certain exemplary embodiments, excavating machine 1100 can be powered by an intrinsic diesel engine using a motor-generator set. In certain exemplary embodiments, excavating machine 1100 can be powered by a power transmitting electrical cable. The power transmitting electrical cable can obtain electrical power from a high voltage power transmission line coupled to a private or commercial electric power distribution grid.

Excavating machine 1100 can comprise a plurality of sensors 1120, 1130, 1140. Any of sensors 1120, 1130, 1140 can measure, for example: time, pressure, temperature, flow, mass, heat, flux, light, sound, humidity, proximity, position, velocity, acceleration, vibration, voltage, current, capacitance, resistance, inductance, and/or electromagnetic radiation, etc., and/or a change of any of those properties with respect to time, position, area, etc. Any of sensors 1120, 1130, 1140 can be communicatively coupled to an information device 1160.

Information device 1160 can comprise a user interface 1170 and/or a user program 1180. User program 1180 can, for example, be adapted to obtain, store, and/or accumulate material weights from the bucket of the excavating machine. In certain exemplary embodiments, user program 1180 can monitor material weights loaded from excavating machine 1100 to a haulage machine. Information device 1500 can prompt a user via user interface 1170 with information indicative of whether material in the bucket of excavating machine 1100 should be loaded in the haulage machine and/or prompt an operator of the excavating machine to fully or partially fill a next bucket with material.

Information device 1160 can be adapted to process information related to any of sensors 1120, 1130, 1140. For example, information device 1160 can estimate a weight of material held in a bucket of excavating machine 1100 responsive to a hoist torque, a hoist speed, and/or a hoist acceleration, etc. Information device 1160 can be adapted to accumulate material weights loaded from excavating machine 1100 to a haulage machine such as a mine haul truck. Information device 1160 can be adapted to determine if the material weight in the bucket of excavating machine 1100 can be loaded onto the haulage machine without exceeding a predetermined carrying capacity for the haulage machine. Information device 1160 can prompt an operator of excavating machine 1100 with information indicative of whether material in the bucket of excavating machine 1100 should be loaded in the haulage machine. Information device 1160 can be adapted to prompt an operator of a fraction of a bucket load to dig in order to properly load the haulage machine.

Any of sensors 1120, 1130, 1140, and/or information device 1160 can be communicatively coupled to a wireless transceiver 1150. Wireless transceiver 1150 can be adapted to communicate data related to excavating machine 1100 via a wireless transceiver 1200. Data related to excavating machine 1100 can comprise electrical measurements such as voltages, currents, resistances, and/or inductances, etc.; mechanical measurements such as torques, shaft speeds, and/or accelerations, etc.; temperature measurements such as from a motor, bearing, and/or transformer, etc.; pressure measurements such as air and/or lubrication pressures; weight measurements such as dipper load, truck load, last truck load, shift total weight; and/or time measurements, etc.

A network 1300 can communicatively couple wireless transceiver 1200 to devices such as an information device 1500 and/or a server 1400. Server 1400 can be adapted to receive information transmitted from excavating machine 1100 via wireless transceiver 1150 and wireless transceiver 1200. Server 1400 can be communicatively coupled to a memory device 1600. Memory device 1600 can be adapted to store information from excavating machine 1100. Memory device 1600 can store information, for example, in a format compatible with a database standard such as XML, Microsoft SQL, Microsoft Access, MySQL, Oracle, FileMaker, Sybase, and/or DB2, etc.

Information device 1500 can be adapted to obtain and/or receive information from server 1400 related to excavating machine 1100. Information device 1500 can comprise a user interface 1560 and/or a client program 1540. Client program 1540 can, for example, be adapted to obtain and/or accumulate material weights loaded from excavating machine 1100 to a haulage machine such as a mine haul truck. Client program 1540 can be adapted to determine if the material weight in the bucket of excavating machine 1100 can be loaded onto the haulage machine without exceeding a predetermined carrying capacity for the haulage machine. Information device 1500 can prompt a user via user interface 1560 with information indicative of whether material in the bucket of excavating machine 1100 should be loaded in the haulage machine. Information device 1500 can be adapted to communicate whether material in the bucket of excavating machine 1100 should be loaded in the haulage machine to excavating machine 1100. Information device 1500 can communicate with excavating machine 1100 via wireless transceiver 1200 and wireless transceiver 1150. Information device 1500 can prompt and/or render information for the user via user interface 1520.

Figure 2:
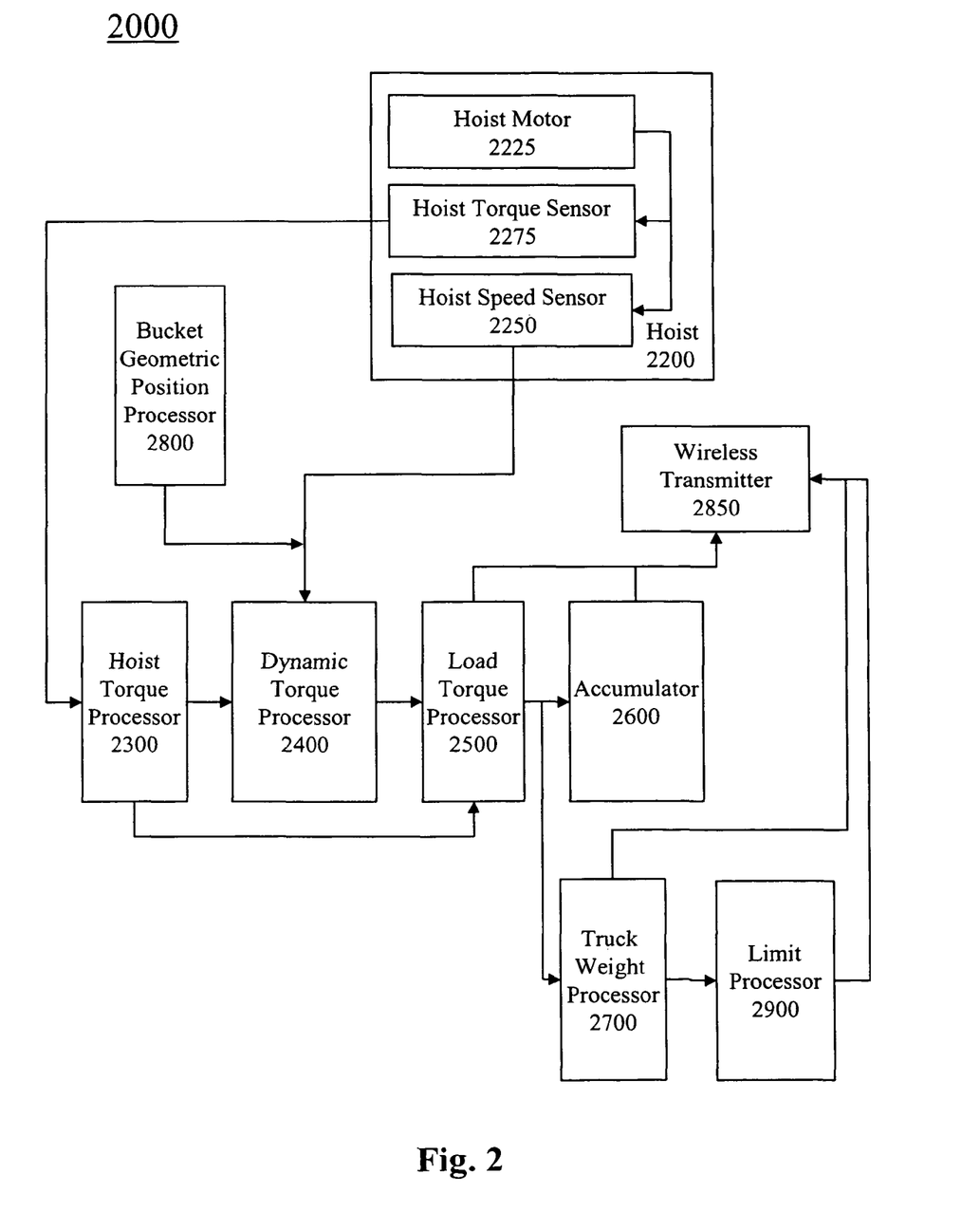
FIG. 2 is a block diagram of an exemplary embodiment of a load measuring system 2000.

FIG. 2 is a block diagram of an exemplary embodiment of a load measuring system 2000 for an excavating machine such as an electric mining shovel and/or a front end loader. The excavating machine can comprise a bucket usable for digging and/or holding material such as excavated earth. Load measuring system 2000 can comprise a hoist 2200. Hoist 2200 can comprise a hoist motor 2225 adapted to be powered by either an alternating current or a direct current. Hoist motor 2225 can be mechanically coupled to a hoist component such as a cable reel, a cable spool, a cable, a hydraulic pump, and/or a mechanical linkage, etc. Hoist motor 2225 can be adapted to move a bucket related to the excavating machine at least vertically.

Hoist 2200 can comprise a hoist speed sensor 2250. Hoist speed sensor 2250 can measure a speed related to the hoist using a device that can be coupled to a component of hoist 2200 mechanically, electro-mechanically, magnetically, and/or optically, etc. Hoist speed sensor 2250 can be communicatively coupled to a dynamic torque processor 2400.

Hoist 2200 can comprise a hoist torque sensor 2275. Hoist torque sensor 2275 can measure a torque related to hoist motor 2225, for example, utilizing a strain gauge, an angular accelerometer, a dynamometer, and/or by measuring an electrical property such as a two-phase current transformation in conjunction with a two-phase flux transformation to calculate instantaneous torque, frequency, slip-speed, and/or phase shift, etc. Hoist torque sensor 2275 can detect, measure, and/or transmit information indicative of a torque related to hoist motor 2225 to a processor, such as a hoist torque processor 2300.

The hoist torque can be considered as proportional to a total force applied to hold and/or move a bucket of the excavating machine. Hoist torque can be conceptually separated into at least two components. The hoist torque can comprise a load torque component. The load torque component can be considered as proportional to a force applied to hold and/or move a bucket of the excavating machine in a frictionless system. The load torque in turn can be considered as being composed of a material weight torque and an empty bucket torque. The material weight torque can be calculated by subtracting a torque associated with an empty bucket from the load torque.

The hoist torque can comprise a dynamic torque component. The dynamic torque can be considered as proportional to a combination of forces that accelerate the load and overcome movement resistances and/or losses due to, for example, static or dynamic friction, bearing friction, pulley friction, gearbox friction, cable winding slippage, and/or motor winding losses, etc. Resistances due to static or dynamic friction can be due, for example, to cables in contact with pulleys associated with the excavating machine hoist.

Thus, by equation:

$$T_H = T_D + T_L$$

$$T_L = RW_L$$

$$W_L = W_{EM} + W_{MT}$$

where:
- $T_H$ is the hoist torque,
- $T_D$ is the dynamic torque (the torque component associated with moving the bucket and the resulting resistances, losses, and/or friction),
- $T_L$ is the load torque,
- $W_L$ is the load weight,
- R is a level arm related to the force (a determinable value and/or constant in certain exemplary embodiments),
- $W_{EM}$ is the weight of excavated material in the excavating machine bucket, and
- $W_{MT}$ is the weight of an excavating machine bucket when substantially empty.

The hoist torque can also be expressed by the equation:

$$T_H = I\alpha = F_M R$$

where I is the mass moment of inertia of the hoist motor's rotor,
α is the angular acceleration of the rotor,
$F_M$ is force applied by the rotor.

In certain exemplary embodiments, I and R can be calculable as constants for a particular hoist and/or hoisting assembly and α can be measureable. Thus, $F_M$ can be calculable and represents the total force applied to accelerate the excavating machine bucket and overcome resistances, losses, and/or friction opposing that motion. In calculating a force balance around the excavating bucket:

$$F_M = W_{EM} + W_{MT} + F_F$$

where $F_F$ is the force applied to move the excavating machine bucket while overcoming any resistances, losses, and/or friction that oppose moving the bucket.

In certain exemplary embodiments, $F_F$ can be affected by and/or determined based upon a geometric position of the excavating machine bucket. That is, when the bucket is in certain positions and/or orientations, for example, a greater frictional contact and/or frictional load between a cable and pulley can occur, thereby raising $F_F$, while other positions and/or orientations can create less friction.

Hoist torque processor 2300 can be adapted to receive a measurement of a hoist torque of the excavating machine. Hoist torque processor 2300 can be adapted to communicate the hoist torque to a dynamic torque processor 2400 and/or a load torque processor 2500.

Certain exemplary embodiments can comprise a bucket geometric position processor 2800. Geometric position processor 2800 can be adapted to measure and/or receive a measurement indicative of a relative position of the bucket to another element of the excavating machine and/or a fixed reference. Geometric position processor 2800 can be adapted to determine the relative position of the bucket via, for example, at least one proximity switch, a detection device measuring at least one length and/or angle of extended cable, an angular sensor, a GPS based position locator, and/or an optical device. Geometric position processor 2800 can provide information indicative of the relative position of the bucket to dynamic torque processor 2400. The relative position of the bucket can be associated with an amount of static friction to be overcome to initiate movement of the bucket and/or an amount of dynamic friction to be overcome to maintain movement of the bucket. Thus, the relative position of the bucket can be associated with the magnitude of the dynamic torque. By subtracting the dynamic torque from the hoist torque, the load torque can be determined, from which the weight of the loaded bucket can be estimated, calculated, and/or corrected.

Dynamic torque processor 2400 can be adapted to determine a dynamic torque related to hoist 2200. Dynamic torque processor 2500 can determine a hoist acceleration from information provided by hoist speed sensor 2250. If hoist motor 2275 is not accelerating and is substantially stationary, the dynamic torque can be estimated as approximately zero and load torque processor 2500 can determine the load torque to be approximately equal to the hoist torque.

In certain exemplary embodiments, dynamic torque processor 2400 can receive and/or determine a static friction factor and/or a dynamic friction factor associated with hoist 2200. In certain exemplary embodiments, dynamic torque processor 2400 can calculate the dynamic torque related to hoist 2000 via considering the static friction factor and/or the dynamic friction factor. Dynamic torque processor 2400 can be adapted to provide the dynamic torque to load torque processor 2500.

If hoist 2200 is moving, load torque processor 2500 can determine the load torque of the excavating machine via subtracting the dynamic torque from the hoist torque. The material weight held in the bucket of the excavating machine can be calculated by load torque processor 1500 by subtracting a weight of the excavating machine bucket when substantially empty from a value proportional to the load torque. Load torque processor 2500 can be adapted to provide information indicative of a material weight held in the bucket of the excavating machine to an accumulator 2600, a machine weight processor 2700, and/or a wireless transmitter 2850.

Accumulator 2600 can be adapted to receive an estimate of a material weight contained in the bucket of the excavating machine. Accumulator 3600 can be adapted to provide a total weight, for example, excavated during a given time period, on a particular mining shift, and/or by a particular machine operator, and/or a total weight of material provided to a particular truck, group of trucks, etc.

Load torque processor 2500 can be communicatively coupled to machine weight processor 2700. From load torque processor 2500, machine weight processor 2700 can receive and/or sum one or more weights related to materials loaded on a haulage machine. In certain exemplary embodiments, the haulage machine can be a mine haul truck. Machine weight processor 2700 can be communicatively coupled to a limit processor 2900. Limit processor 2900 can be adapted to automatically determine if a weight and/or total weight loaded and/or loadable on the haulage machine exceeds a predetermined threshold. Limit processor 2900 can be adapted to render information to a user indicative of an overloaded or potentially overloaded condition if the weight loaded and/or loadable on the haulage machine exceeds the predetermined threshold.

Notably, because forces can be converted to torques, which can be converted to powers, any of the above-mentioned processors can be adapted accordingly to deal with the appropriate property (i.e., force, torque, and/or power, etc.).

Figure 3:
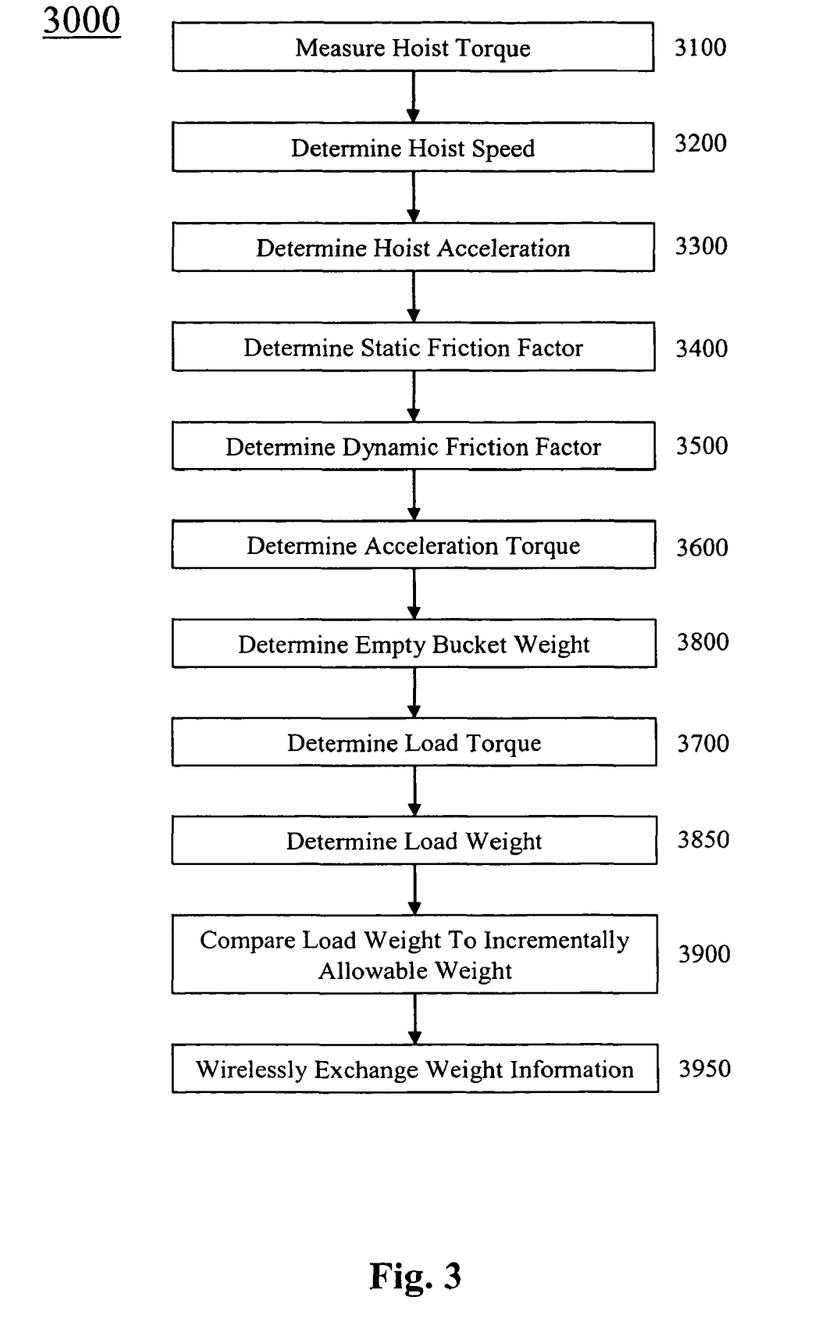
FIG. 3 is a flow diagram of an exemplary embodiment of a load measuring method 3000.

FIG. 3 is a flow diagram of an exemplary embodiment of a load measuring method 3000 for an excavating machine such as an electric mining shovel, a front end loader, and/or a bucket wheel excavator, etc. Load measuring method 3000 can be used for improving operations related to an excavating activity such as mining. At activity 3100, a hoist torque can be measured and/or determined.

At activity 3200, a hoist speed can be determined. A measurement related to the hoist speed can be measured via, for example, a tachometer. The tachometer can be a mechanical device directly or indirectly coupled to a shaft associated with the hoist, an optical device adapted to determine the speed from a signal reflected from at least one part of the hoist, and electrical device adapted to measure an electrical property (such as frequency or slip-speed) related to a rotor speed associated with the hoist, and/or a magnetic device adapted to detect variations in magnetic flux related to the hoist speed, etc.

At activity 3300, a hoist acceleration can be determined. The hoist acceleration can be determined by comparing a first hoist speed associated with a first time to a second hoist speed associated with a second time. The hoist acceleration can be a linear acceleration or an angular acceleration. If a linear acceleration, the hoist acceleration can represent an acceleration of, for example, the bucket along a line, such as a vertical line. If an angular acceleration, the hoist acceleration can represent an acceleration of the hoist motor's rotor or a shaft directly coupled directly thereto (i.e., without an angular speed change mechanism therebetween). The hoist acceleration can be used in estimating the dynamic torque. Estimating the dynamic torque can improve an estimate of an excavated material weight in the bucket of the excavating machine.

At activity 3400, a static friction factor can be determined. The static friction factor can relate, for example to a hoist cable resting on various pulleys, spools, and/or surfaces related to the hoist, etc. The static friction factor and/or force can be effected by and/or determined responsive to a geometric bucket position. The static friction factor can be used to improve the accuracy of a determination of the dynamic torque.

At activity 3500, a dynamic friction factor can be determined. The dynamic friction factor can relate, for example to a hoist cable moving over various pulleys, spools, reels, positioners, and/or surfaces related to the hoist. The static friction factor can be effected by and/or determined responsive to the geometric bucket position. The dynamic friction factor can be used to improve the accuracy of a determination of the dynamic torque.

At activity 3600, the dynamic torque can be determined. The dynamic torque can be estimated via determining the amount of torque used to overcome friction and/or sustain motion. The dynamic torque determination can be effected by the relative geometric position of the bucket.

At activity 3700, the torque and/or weight related to the bucket when substantially empty can be determined. The torque and/or weight related to the bucket when substantially empty can be measured directly, calculated, and/or received from a previous determination of the torque. The torque and/or weight of the bucket when substantially empty can be related to a weight associated with the bucket. Subtracting the torque and/or weight related to the bucket when substantially empty can improve an estimate of the material weight in the bucket.

At activity 3800, a load torque can be determined and/or calculated. In certain exemplary embodiments, the load torque can be averaged over, for example, a load cycle, a vertical rise or fall of the bucket, and/or a series of measurements, such as a series of measurements associated with a given load of excavated material. Such averaging can provide an improved estimate of the weight of the material held in the bucket.

At activity 3850, the load weight can be determined. The determined material weight can be used for control and/or reporting purposes.

At activity 3900, the material weight can be compared to an incrementally allowable weight. In certain exemplary embodiments, the excavating machine can load the material into a haulage machine. The haulage machine can be a mine haul truck, flexible conveyor train, and/or fixed conveyor system, etc. The haulage machine can have a predetermined load carrying capacity. An accumulator can manually and/or automatically track the amount of material loaded on the haulage machine. If the sum of the material weight in the excavating machine bucket and the material weight already in the haulage machine does not exceed the predetermined load carrying capacity of the haulage machine, the material can be loaded in the haulage machine. If the sum of the material weight in the excavating machine bucket and the material weight already in the haulage machine exceeds the predetermined load carrying capacity of the haulage machine, a user can be prompted that loading the material in the haulage machine will overload the haulage machine. In certain exemplary embodiments a user can be automatically notified if adding the next bucket will result in an exceedance of the predetermined load carrying capacity of the haulage machine. In certain exemplary embodiments, an operator of the excavating machine can be prompted to dig and/or load only a partial bucket of material to load on the haulage machine.

At activity 3950, information can be wirelessly transmitted related to the excavating machine. Wirelessly transmitted information can comprise weight of material in the excavating machine bucket, hoist performance, and/or hoist utilization, etc. Wirelessly transmitted information can be provided to an information device and/or a remote server. The wirelessly received information can be stored in a memory device and/or remotely reported via a client information device. The client information device can render and/or accumulate data across a plurality of excavating machines, haulage machines, hoists, shifts, time periods, operators, supervisors, and/or mines to allow for reporting and/or analysis.

The excavating machine and/or hoist can wirelessly receive information, such as weight information, from a remote wireless transmitter associated with, for example, the server and/or the client information device. Information received can, for example, be indicative of whether the material in the excavating machine bucket should be loaded on the haulage machine. Information received can comprise an index of haulage machines assigned to the excavating machine, performance related information related to material excavation, and/or repair recommendation related to the excavating machine, etc.

Figure 4:
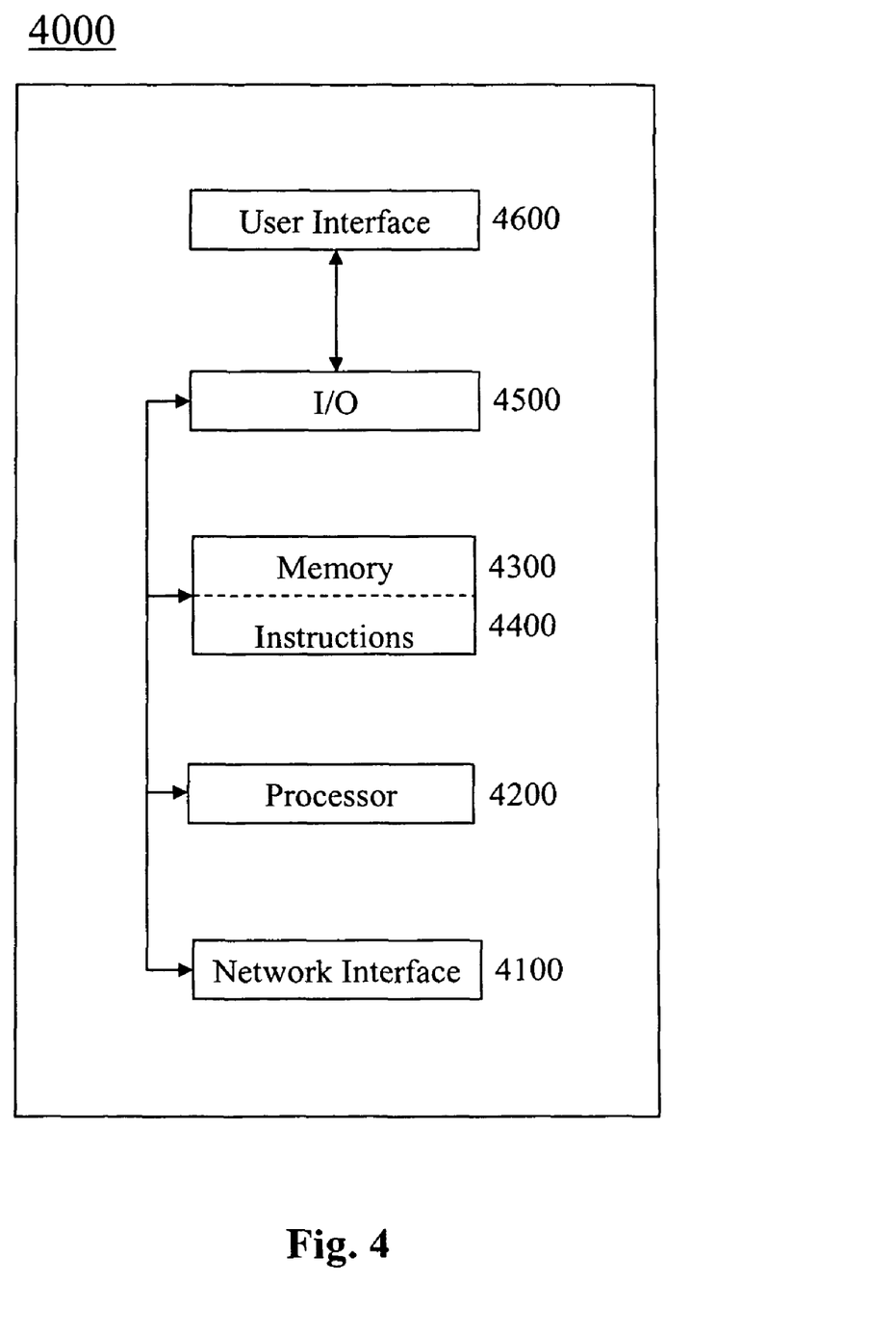
FIG. 4 is a block diagram of an exemplary embodiment of an information device 4000.

FIG. 4 is a block diagram of an exemplary embodiment of an information device 4000, which in certain operative embodiments can comprise, for example, hoist torque processor 2300, dynamic torque processor 2400, load torque processor 2500, accumulator 2600, truck weight processor 2700, limit processor 2900, and/or bucket geometric processor 2800 of FIG. 2. Information device 4000 can comprise any of numerous well-known components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to a material weight held in a bucket of an excavating machine, a material weight loaded in a haulage machine, and/or a material weight extracted by the excavating machine during a particular time period, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method for calculating a weight of a material in a bucket of an excavating machine, wherein, in response to rotation of a shaft of a hoist motor, the bucket moves in a substantially vertical direction, the method comprising:
    determining a first relationship, wherein the first relationship associates values of static friction with values of bucket position;
    determining a second relationship, wherein the second relationship associates values of dynamic friction with values of bucket position;
    determining a value of hoist torque of the hoist motor;
    determining a specific bucket position;
    determining whether the bucket is stationary;
    upon determining that the bucket is stationary:
        determining, based on the first relationship, a specific value of static friction associated with the specific bucket position;
        determining, based at least in part on the specific value of static friction, a value of dynamic torque of the hoist motor;
        calculating a value of load torque of the hoist motor by subtracting the value of the dynamic torque of the hoist motor from the value of the hoist torque of the hoist motor; and
        calculating the weight of the material based at least in part on the load torque of the hoist motor; and
    upon determining that the bucket is not stationary:
        determining, based on the second relationship, a specific value of dynamic friction associated with the specific bucket position;
        determining, based at least in part on the specific value of dynamic friction, a value of dynamic torque of the hoist motor;
        calculating a value of load torque of the hoist motor by subtracting the value of the dynamic torque of the hoist motor from the value of the hoist torque of the hoist motor; and
        calculating the weight of the material based at least in part on the load torque of the hoist motor.

2. The method of claim 1, further comprising:
    upon determining that the bucket is stationary, determining an acceleration of the bucket;
    wherein determining, based at least in part on the specific value of static friction, a value of dynamic torque of the hoist motor is further based at least in part on the acceleration of the bucket.

3. The method of claim 1, further comprising:
    upon determining that the bucket is not stationary, determining a speed of the bucket;
    wherein determining, based at least in part on the specific value of dynamic friction, a value of dynamic torque of the hoist motor is further based at least in part on the speed of the bucket.

4. The method of claim 1, further comprising:
    upon determining that the bucket is not stationary, determining an acceleration of the bucket;
    wherein determining, based at least in part on the specific value of dynamic friction, a value of dynamic torque of the hoist motor is further based at least in part on the acceleration of the bucket.

5. The method of claim 1, further comprising:
    wirelessly transmitting the calculated weight of the material to an information device.

6. The method of claim 1, further comprising:
    receiving a value of a maximum weight;
    comparing the calculated weight of the material to the value of the maximum weight; and
    upon determining that the calculated weight of the material does not exceed the value of the maximum weight, transferring the material to a mine haul truck.

7. The method of claim 1, wherein the excavating machine is an electric mining shovel.

8. A computer readable medium storing computer program instructions for calculating a weight of a material in a bucket of an excavating machine, wherein, in response to rotation of a shaft of a hoist motor, the bucket moves in a substantially vertical direction, wherein the computer program instructions, when executed by a processor, cause the processor to perform a method comprising:
    determining a first relationship, wherein the first relationship associates values of static friction with values of bucket position;
    determining a second relationship, wherein the second relationship associates values of dynamic friction with values of bucket position;
    determining a value of hoist torque of the hoist motor;
    determining a specific bucket position;
    determining whether the bucket is stationary;
    upon determining that the bucket is stationary:
        determining, based on the first relationship, a specific value of static friction associated with the specific bucket position;
        determining, based at least in part on the specific value of static friction, a value of dynamic torque of the hoist motor;
        calculating a value of load torque of the hoist motor by subtracting the value of the dynamic torque of the hoist motor from the value of the hoist torque of the hoist motor; and
        calculating the weight of the material based at least in part on the load torque of the hoist motor; and
    upon determining that the bucket is not stationary:
        determining, based on the second relationship, a specific value of dynamic friction associated with the specific bucket position;
        determining, based at least in part on the specific value of dynamic friction, a value of dynamic torque of the hoist motor;
        calculating a value of load torque of the hoist motor by subtracting the value of the dynamic torque of the hoist motor from the value of the hoist torque of the hoist motor; and
        calculating the weight of the material based at least in part on the load torque of the hoist motor.

9. The computer readable medium of claim 8, wherein the method further comprises:
    upon determining that the bucket is stationary, determining an acceleration of the bucket;

wherein determining, based at least in part on the specific value of static friction, a value of dynamic torque of the hoist motor is further based at least in part on the acceleration of the bucket.

10. The computer readable medium of claim 8, wherein the method further comprises:
    upon determining that the bucket is not stationary, determining a speed of the bucket;
    wherein determining, based at least in part on the specific value of dynamic friction, a value of dynamic torque of the hoist motor is further based at least in part on the speed of the bucket.

11. The computer readable medium of claim 8, wherein the method further comprises:
    upon determining that the bucket is not stationary, determining an acceleration of the bucket;
    wherein determining, based at least in part on the specific value of dynamic friction, a value of dynamic torque of the hoist motor is further based at least in part on the acceleration of the bucket.

12. The computer readable medium of claim 8, wherein the method further comprises:
    wirelessly transmitting the calculated weight of the material to an information device.

13. The computer readable medium of claim 8, wherein the method further comprises:
    receiving a value of a maximum weight;
    comparing the calculated weight of the material to the value of the maximum weight; and
    upon determining that the calculated weight of the material does not exceed the value of the maximum weight, transferring the material to a mine haul truck.

14. A system for calculating a weight of a material in a bucket of an excavating machine, wherein, in response to rotation of a shaft of a hoist motor, the bucket moves in a substantially vertical direction, the system comprising:
    means for determining a first relationship, wherein the first relationship associates values of static friction with values of bucket position;
    means for determining a second relationship, wherein the second relationship associates values of dynamic friction with values of bucket position;
    means for determining a value of hoist torque of the hoist motor;
    means for determining a specific bucket position;
    means for determining whether the bucket is stationary;
    means for, upon determining that the bucket is stationary:
        determining, based on the first relationship, a specific value of static friction associated with the specific bucket position;
        determining, based at least in part on the specific value of static friction, a value of dynamic torque of the hoist motor;
        calculating a value of load torque of the hoist motor by subtracting the value of the dynamic torque of the hoist motor from the value of the hoist torque of the hoist motor; and
        calculating the weight of the material based at least in part on the load torque of the hoist motor; and
    means for, upon determining that the bucket is not stationary:
        determining, based on the second relationship, a specific value of dynamic friction associated with the specific bucket position;
        determining, based at least in part on the specific value of dynamic friction, a value of dynamic torque of the hoist motor;
        calculating a value of load torque of the hoist motor by subtracting the value of the dynamic torque of the hoist motor from the value of the hoist torque of the hoist motor; and
        calculating the weight of the material based at least in part on the load torque of the hoist motor.

15. The system of claim 14, further comprising:
    means for, upon determining that the bucket is stationary, determining an acceleration of the bucket;
    wherein:
    the means for determining, based at least in part on the specific value of static friction, a value of dynamic torque of the hoist motor comprises means for determining, based at least in part on the specific value of static friction and based at least in part on the acceleration of the bucket, the value of dynamic torque of the bucket.

16. The system of claim 14, further comprising:
    means for, upon determining that the bucket is not stationary, determining a speed of the bucket;
    wherein:
    the means for determining, based at least in part on the specific value of dynamic friction, a value of dynamic torque of the hoist motor comprises means for determining, based at least in part on the specific value of dynamic friction and based at least in part on the speed of the bucket, the value of dynamic torque of the hoist motor.

17. The system of claim 14, further comprising:
    means for, upon determining that the bucket is not stationary, determining an acceleration of the bucket;
    wherein:
    the means for determining, based at least in part on the specific value of dynamic friction, a value of dynamic torque of the hoist motor comprises means for determining, based at least in part on the specific value of dynamic friction and based at least in part on the acceleration of the bucket, the value of dynamic torque of the hoist motor.

18. The system of claim 14, further comprising:
    means for wirelessly transmitting the calculated weight of the material to an information device.

19. The system of claim 14, further comprising:
    means for receiving a value of a maximum weight;
    means for comparing the calculated weight of the material to the value of the maximum weight; and
    means for, upon determining that the calculated weight of the material does not exceed the value of the maximum weight, transferring the material to a mine haul truck.

20. The system of claim 14, wherein the excavating machine is an electric mining shovel.

* * * * *